(No Model.) 2 Sheets—Sheet 1.
H. WYMAN.
MECHANICAL MOVEMENT.
No. 283,364. Patented Aug. 14, 1883.
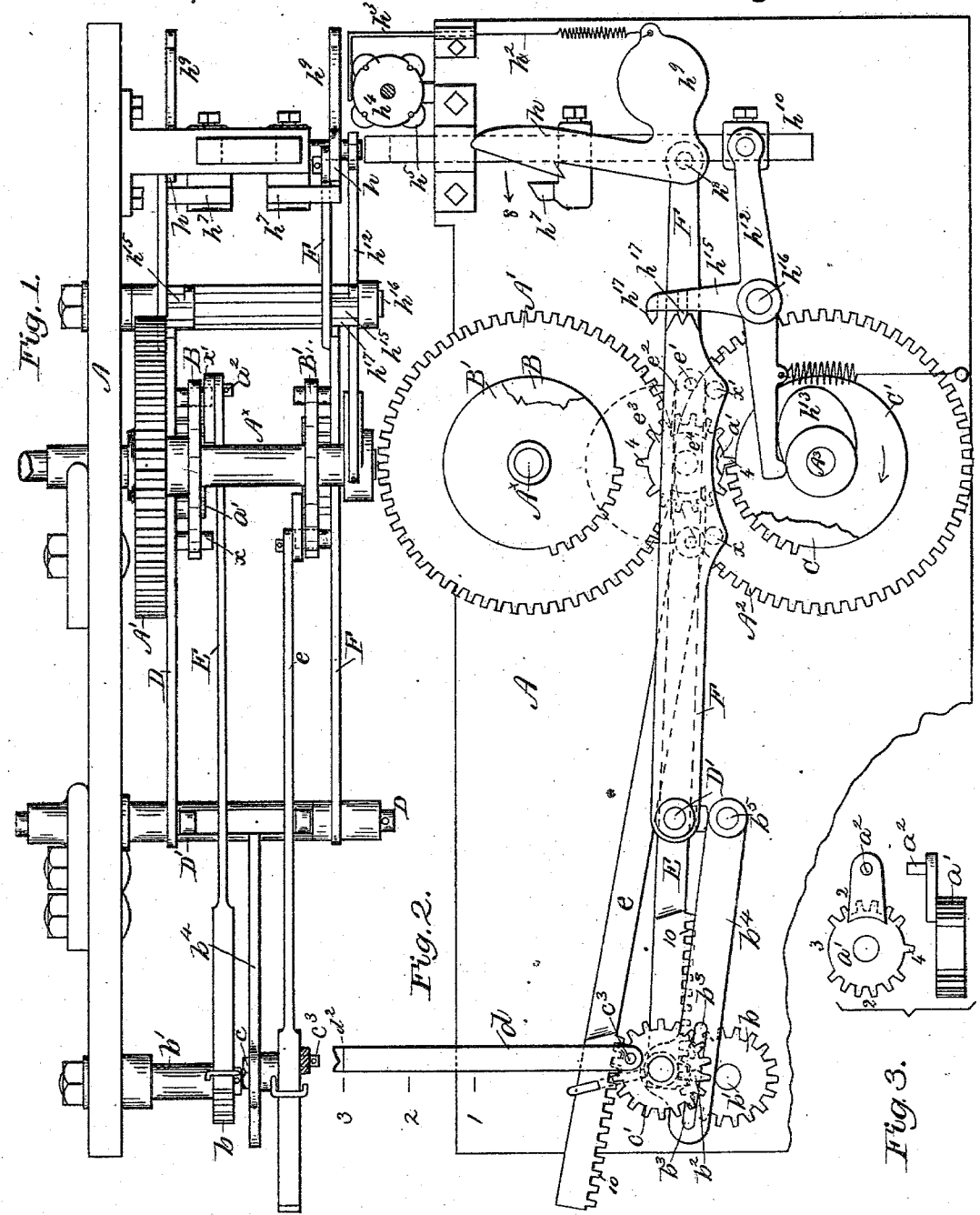
Witnesses
A. O. Orne
Fred N. Powell
Inventor
Horace Wyman
by Crosby Gregory
Attys.

(No Model.) 2 Sheets—Sheet 2.
H. WYMAN.
MECHANICAL MOVEMENT.
No. 283,364. Patented Aug. 14, 1883.
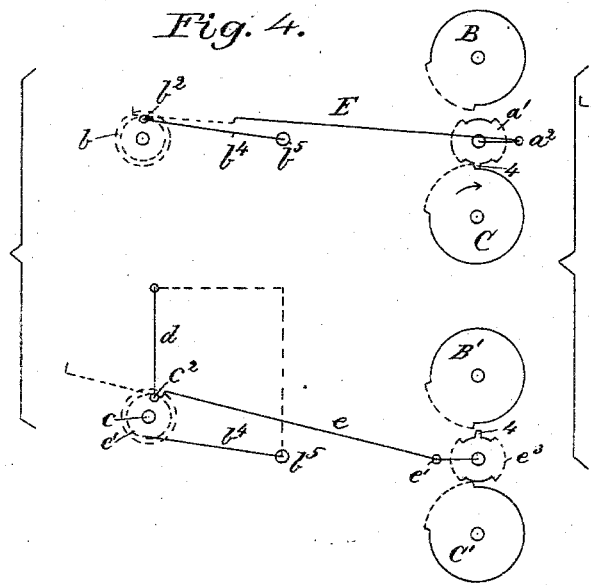
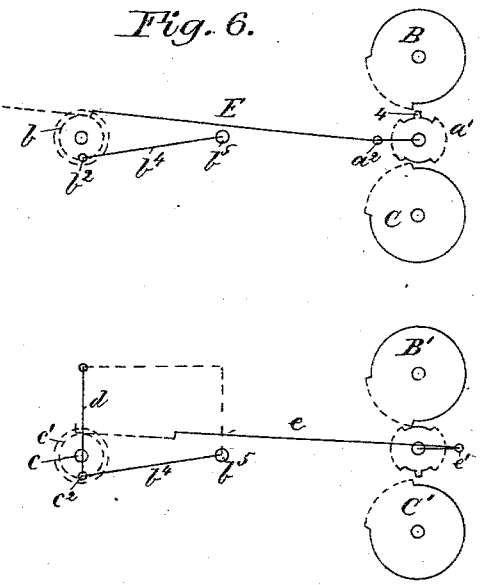
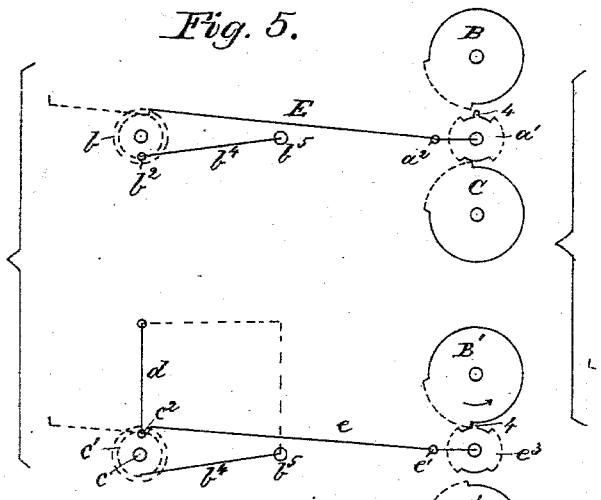
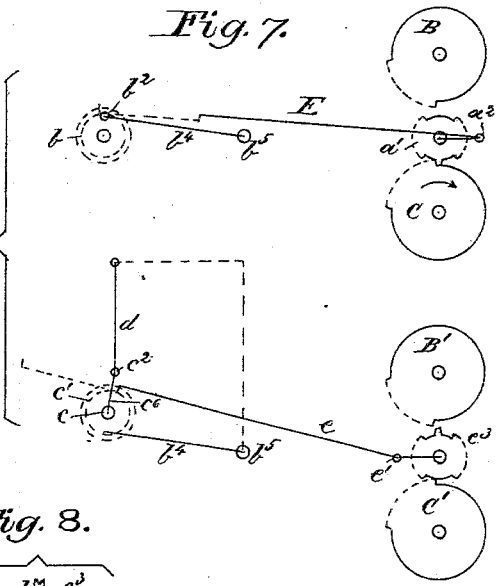
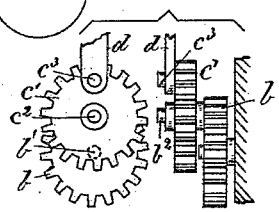
Witnesses
A. O. Orr
Fred A. Powell
Inventor
Horace Wyman
by Crosby & Gregory
Attys.

UNITED STATES PATENT OFFICE.

HORACE WYMAN, OF WORCESTER, MASSACHUSETTS.

MECHANICAL MOVEMENT.

SPECIFICATION forming part of Letters Patent No. 283,364, dated August 14, 1883.

Application filed April 9, 1883. (No model.)

*To all whom it may concern:*

Be it known that I, HORACE WYMAN, of Worcester, county of Worcester, and State of Massachusetts, have invented an Improvement in Mechanical Movements, of which the following description, in connection with the accompanying drawings, is a specification, like letters on the drawings representing like parts.

This invention relates to an improved mechanism for converting rotary into reciprocating motion of greater or less extent. The mechanism herein shown includes two series of rotating partial gears, which at different times act upon and turn first in one and then in an opposite direction, for substantially a half-rotation, gears carried by vibrators, the positions of which are governed by devices under the control of a pattern surface or chain. These vibrator-gears have cranks and crank-pins, which, by connectors in operative engagement with a carrier-gear and with a connecting-rod gear, each on a different stud or center, turn the said gears for substantially a half-rotation in the same or in opposite directions, and at the same or different times, as will be described. A crank-pin on the carrier-gear referred to acts to raise and lower the connecting-rod gear, and preferably by a crank-pin on the carrier-gear, which enters a slot in and moves a carrier-lever which contains the stud on which the connecting-rod gear is mounted to turn, it having a crank-pin to receive the connecting-rod, which is to be reciprocated for a greater or less distance.

Figure 1 represents in top view a mechanical movement embodying my invention; Fig. 2, a side view of Fig. 1. Fig. 3 represents the vibrator-gear detached; Figs. 4, 5, and 6, various positions of some of the parts shown in Fig. 1; Fig. 7, a side view of one of the vibrators, and Fig. 8 a detail in front and side view of a modification to be referred to.

In the drawings, A represents the frame-work of suitable shape to hold the working parts, and $A^x$ is a rotating shaft provided with a toothed wheel, $A'$, which engages and drives a toothed wheel, $A^2$, of same size, loose on a stud, $A^3$. The shaft $A^x$ also carries two partial gears, B B′, of like size and construction, they having teeth thereon for but a portion of their peripheries, as shown by the gear B′ in Fig. 2. The toothed wheel $A^2$ has connected with it a hub or sleeve, on which are secured two partial gears, C C′, of the same shape and size as the gears B B′, and arranged, respectively, in the same vertical planes with and directly under the latter gears.

In the mechanism herein described I employ two vibrators, F D, each constructed just alike, and having their fulcra D′ in the same line. The vibrator F has a stud, $e^4$, on which is mounted the vibrator-gear $e^3$, having an arm or crank, $e^2$, provided with a crank, as shown at 10. The vibrator D has a vibrator-gear, $a'$, provided with a crank-pin, $a^2$, and with it is connected a rack-bar, E, having teeth 10.

The rack-bar $e$ and gear $e^3$ and rack-bar E and gear $a'$ are alike, and each of the said gears have their teeth partially removed, as best shown by gear $a'$ in Fig. 3, leaving two series of teeth, 2, a disengaging space, 3, and an isolated tooth, 4, with a tooth removed at each side of it. Each tooth 4 serves as an engaging-tooth, or as the tooth to be first engaged by the teeth of the partial gear, which is to turn it for half a rotation, and the said partial gear having so turned the vibrator-gear engaged by it, the teeth of the partial gear and the vibrator-gear run out of mesh at the space 3, leaving the vibrator-gear at rest with its arm in contact with one or the other of two stop-pins, $x\ x'$, fast on the vibrator, and with the isolated tooth 4 ready to be engaged by the teeth of the partial gear next to move it in the reverse direction when the vibrator is again moved, as will now be described.

Each vibrator has at its outer end a like hook, $h$, pivoted thereto at $h^8$ and weighted at $h^9$, to normally stand in the position shown in Fig. 2. Each hook is connected by a flexible connector, $h^2$, with a rod, $h^3$, which is shown as extended over and so as to be acted upon by a projection of a pattern-surface, $h^4$, turned in any usual manner and supported in bearings on the frame-work A. When a projection, $h^5$, on the pattern-surface meets the bar $h^3$, it is lifted, and the hook $h$ is moved about its pivot, so as to be caught by the reciprocating bar $h^7$ when its carrying-rod $h^{10}$ is lifted by the lever $h^{12}$, actuated in one direction by the cam $h^{13}$ on the sleeve carrying the gears C C′, before referred to. As the bar $h^7$ rises and carries with it the hook $h$ the flexible connection $h^2$ bends or becomes slack and permits the pattern-surface to be moved or turned in any suitable way, and when the said bar descends, if a projection is left under the bar $h^3$, the flexible connection $h^2$, as it is straightened, keeps the hook in engagement with the lifting-bar $h^7$; but if a projection is wanting under the bar, then the weighted part $h^9$ of the hook $h$ causes it to turn into the position shown in full lines, Fig. 2, and the vibrator connected with the said hook is left down.

The shaft $h^{10}$, carrying the lever $h^{12}$, has two like arms, $h^{15}$, provided with two projections, $h^{17}$, adapted to engage suitable notches in the ends of the vibrators and lock them in position, either in their highest or lowest positions, as the partial gears engage the vibrator-gears.

I have only shown the pattern-surface in Fig. 2.

The connector $e$ by its rack-teeth engages and turns the connecting-rod gear $c'$, mounted on stud $c$, and having a crank-pin, $c^3$, on which is placed the connecting-rod $d$, which may be moved over a distance from 1 to 3, or 1 to 2, or from 2 to 3, or vice versa. I have made a line, $d^2$, on the connecting-rod, and the said rod, by the devices shown in the drawings, may be moved at will by a pattern-surface having suitable projections, to place the said line opposite either of the said figures, and move from either of the said figures to either of the others.

The stud $c$, which carries the gear $c'$, is made movable vertically, and, as shown in Figs. 1 to 3, is attached to the carrier-lever $b^4$, pivoted at $b^5$ and slotted at $b^3$, for the reception of a crank-pin, $b^2$, (shown in dotted lines, Fig. 2,) and extended from the side of the carrier-gear $b$ on the fixed stud $b'$, the said gear $b$ deriving its semi-rotation from the connector E, attached to the crank-pin $a^2$ of the vibrator-gear $a$. If desired, the carrier-lever $b^4$ might be dispensed with and the gear $c'$ be mounted directly on the crank-pin $b^2$, as in Fig. 8; but I prefer the plan shown in Fig. 2.

The vibrator-gear $a'$, supported by the vibrator D, is arranged between the toothed partial gears B C, and the vibrator-gear $e^3$, carried by the vibrator F, is arranged between the toothed partial gears B' C', and both gears $a'$ $e^3$ are of the same size and shape.

The partial gears B C are adapted to at times turn the gear $a'$ in opposite directions, according to with which one of the said partial gears the said gear $a'$ is made to engage, and the toothed partial gears B' C' act in like manner on the vibrator-gear $e^3$.

By employing a vibrator-gear with a crank-pin attached to an arm extended outward beyond the toothed periphery of the said gear, and leaving a space between the partial gears B B' and the partial gears C C', in which the said arm and crank-pin can travel, I have been enabled to secure a very considerable throw for the connector attached to the said crank-pin from smaller gears, or gears of less diameter than would be possible if the said vibrator-gear were of sufficient diameter to carry the crank-pin within the circle of its teeth, for in such event, to gain a semi-rotation for the vibrator-gear in the proper time with relation to the rotation of the shaft $A^\times$, the gears B B', C C', and A' A² would have to be correspondingly enlarged, and such proportional enlargement would make the said gears so large that they could not be used practically at high speed; but they might be made of less size by employing two intermediates between the gears A' A². Such intermediates are not therefore herein necessary, because of the space between the partial gears and the projection of the crank-pin beyond the vibrator-gear, so it will be seen that the projecting cranks of the vibrator-gears and the space between the partial gears become of importance, and results in great reduction in weight of material to be turned and power required to actuate the parts.

Referring to diagrams Figs. 4 to 6, inclusive, each diagram shows different positions of the crank-pins $b^2$ $c^2$ of the gear $b$ $c$ with the parts for moving them. In diagram 4 both pins $b^2$ $c^2$ are in their highest position, and the upper end of the connecting-rod $d$ will be in its most elevated position. Should the gear C be turned from the position Fig. 4, it would strike the isolated teeth 4 of the vibrator-gear $a'$ and turn it into the position Fig. 5, placing the crank-pin $b^2$ in its lowest position, when the mark $d^2$ on the rod $d$, Fig. 2, would be brought into the intermediate position opposite figure 2.

Referring to Fig. 5, if the partial gear B' should be started, it would engage the isolated teeth 4 of the vibrator-gear $e^3$ and turn it into the position Fig. 6, placing the crank-pin $c^2$ into its lowest position.

In Fig. 6 both crank-pins $b^2$ $c^2$ are in their lowest positions, and the upper end of the connecting-rod $d$ will then be in its lowest position, or the mark $d^2$ will be opposite the figure 1 in Fig. 2.

By lifting or lowering the vibrators D and F, the vibrator-gears may be turned at will in either direction by the connectors to change the positions of the gears $b$ $c$ and their crank-pins to occupy their highest or lowest positions.

Still greater throw of the connecting-rod $d$ may be gained by providing the gear $c'$ with an arm, $c^6$, as shown in diagram Fig. 9, on which to place the crank-pin $c^2$ at a greater distance from the center of the gear $c'$.

By turning the gears $b$ $c$ so that their crank-pins move upward or downward together the highest or lowest positions of the upper end of the rod $d$ may be gained, and by moving the said gears so that one rises as the other falls the upper end of the said rod $d$, or the line $d^2$ thereon, will be placed at a position intermediate the extreme highest and lowest positions thereof.

If the distance between the numbers 1 2 and 2 3 should be considered to be one inch, then it will be understood that the rod $d$ may be reciprocated for one or for two inches, at will, in either direction, and, assuming that the position of crank $c^2$ in Figs. 2 and 4 was right to cause one inch of throw, (a throw twice as great could be gained by placing the crank-pin $c^2$ twice as far from the center $c$ as in Fig. 7,) another inch of throw could be gained for the connecting-rod $d$, or four inches.

The throw of the cranks $b^2$ $c^2$ may be more or less, according to their distances from their centers.

Instead of the crank-pins $b^2$ $c^2$, I might use eccentrics as equivalents.

It is evident that the hook $h$, instead of being weighted to be held out of engagement with the bar $h^3$, may be so weighted as to bring it into engagement with it, and the flexible connector to be so connected with the said hook that when moved by a projection of the pattern-surface the hook would be moved away from the path of the bar $h^3$, instead of into its path, as now shown, without departing from my invention; but I prefer to use it as shown in the drawings.

I claim—

1. The two vibrator-gears provided with crank-pins, two vibrators to carry the said gears, and partial gears to partially rotate the vibrator-gears, and toothed connectors actuated thereby, combined with two gears having cranks, and adapted to be partially rotated by the said connectors, and with a connecting-rod, $d$, attached to one of the said gears, substantially as described.

2. The two vibrator-gears provided with crank-pins, two vibrators upon which they are mounted, and a carrier-gear and a connecting-rod gear, each provided with a crank-pin or eccentric, connectors to turn the carrier-gear and the connecting-rod gear, and a carrier-lever and connecting-rod, $d$, combined with gearing to turn the said vibrator-gears, substantially as described.

3. The partial gears B C, the toothed wheels A' and A², meshed together and adapted to rotate the said partial gears in unison with them, and the vibrator-gear having a radially-projecting arm carrying a crank-pin and placed between the said partial gears, combined with the vibrator D, adapted by its movement to place the vibrator-gear into contact with one or the other of the said partial gears, the said radially-projecting arm in its rotation carrying its crank-pin between the periphery of the partial gear and its actuating-shaft, substantially as described.

4. The vibrator D, vibrator-gear carried by it, and two partial gears adapted each to engage and rotate the said vibrator-gear for half a rotation and leave it at rest, and the carrier-gear, combined with the longitudinally-reciprocating connector between the said vibrator and carrier gears, substantially as described.

5. The two vibrator-gears and vibrators on which they are mounted, and partial gears to actuate the vibrator-gears at suitable times, combined with the pivoted and weighted hooks, under the control of a pattern chain or surface, and with a reciprocating lifter to engage and move the said hooks, substantially as described.

6. The weighted hook, and a lever upon which it is pivoted, and a flexible connection and pattern-surface, combined with a reciprocating lifting-bar to engage the hook and move it and the lever on which it is mounted, substantially as shown.

7. Two toothed crank-gears carried by vibrators, and partial gears to oscillate them, and two toothed connectors reciprocated by the cranks, and two toothed gears oscillated by the toothed connectors, combined with a rod connected to the toothed gears, whereby the said rod may be operated for variable or different distances by the oscillations of the said gears, substantially as described.

In testimony whereof I have signed my name to this specification in the presence of two subscribing witnesses.

HORACE WYMAN.

Witnesses:
J. A. WARE,
H. L. ADAMS.